(12) United States Patent
Marquardt

(10) Patent No.: US 10,865,735 B1
(45) Date of Patent: Dec. 15, 2020

(54) POWER PISTON

(71) Applicant: Steven H. Marquardt, Rhinelander, WI (US)

(72) Inventor: Steven H. Marquardt, Rhinelander, WI (US)

(*) Notice: Subject to any disclaimer, the term of this patent is extended or adjusted under 35 U.S.C. 154(b) by 168 days.

(21) Appl. No.: 15/932,470

(22) Filed: Mar. 3, 2018

(51) Int. Cl.
*F02F 3/00* (2006.01)
*F02F 3/28* (2006.01)
*F02B 23/10* (2006.01)

(52) U.S. Cl.
CPC ............... *F02F 3/28* (2013.01); *F02B 23/10* (2013.01)

(58) Field of Classification Search
CPC ......... F02F 3/00; F02B 23/0696; F02B 77/02; F02B 2023/106; F02B 23/0624; F02B 23/0684; F02B 23/0687
See application file for complete search history.

(56) References Cited

U.S. PATENT DOCUMENTS

| | | | |
|---|---|---|---|
| 1,605,381 A | 10/1926 | Wirrer | |
| 1,708,428 A * | 4/1929 | Moore | F02B 23/08 |
| | | | 123/307 |
| 2,100,143 A * | 11/1937 | Mock | F02B 1/00 |
| | | | 123/261 |
| 2,573,536 A | 7/1951 | Bodine | |
| 2,762,348 A * | 9/1956 | Meurer | F02B 23/0651 |
| | | | 123/279 |
| 2,815,014 A | 12/1957 | Adams | |
| 2,881,743 A * | 4/1959 | Holt | F02B 23/04 |
| | | | 123/263 |
| 2,942,591 A * | 6/1960 | Meurer | F02B 3/00 |
| | | | 123/263 |
| 3,025,839 A * | 3/1962 | Crowther | F02B 3/00 |
| | | | 123/263 |
| 3,057,334 A | 10/1962 | Bailey | |
| 3,079,901 A | 3/1963 | Hallberg | |
| 3,283,751 A | 6/1966 | Goossak | |
| 3,504,681 A | 4/1970 | Winkler | |
| 3,797,466 A | 3/1974 | Nambu | |
| 3,872,841 A * | 3/1975 | Kimbara | F02B 23/0624 |
| | | | 123/263 |
| 3,923,015 A | 12/1975 | Mukai | |
| 4,009,702 A | 3/1977 | Mayer | |
| 4,164,913 A | 8/1979 | Komiyama | |
| 4,370,959 A | 2/1983 | McNair | |
| 4,389,986 A * | 6/1983 | Tanasawa | F02B 1/08 |
| | | | 123/298 |
| 4,467,752 A * | 8/1984 | Yunick | F02B 17/00 |
| | | | 123/193 P |
| 4,543,929 A | 10/1985 | Kataoka | |

(Continued)

FOREIGN PATENT DOCUMENTS

| | | | | |
|---|---|---|---|---|
| JP | 63198720 A | * | 8/1988 | ......... F02B 23/0696 |
| JP | 2006112241 A | * | 4/2006 | |

*Primary Examiner* — George C Jin
*Assistant Examiner* — Teuta B Holbrook
(74) *Attorney, Agent, or Firm* — Boyle Fredrickson S.C.

(57) ABSTRACT

An improved method and means for increasing the efficiency and power output of combustion engines, fluid power devices and other force transmitting applications.
Pressure wave inversion details are provided to increase fluid flow and applied force while reducing friction and wear.
The speed of combustion is also significantly increased which improves fuel economy, emissions and engine performance.

20 Claims, 4 Drawing Sheets

(56) References Cited

U.S. PATENT DOCUMENTS

| | | | |
|---|---|---|---|
| 4,617,888 A * | 10/1986 | Dent | F02F 3/28 |
| | | | 123/193.6 |
| 4,759,323 A | 7/1988 | August | |
| 4,788,942 A | 12/1988 | Pouring | |
| 4,893,592 A | 1/1990 | Falero | |
| 4,920,937 A | 5/1990 | Sasaki | |
| 4,976,248 A | 12/1990 | Rowe | |
| 5,065,715 A | 11/1991 | Evans | |
| 5,102,784 A | 4/1992 | Evans | |
| 5,115,774 A | 5/1992 | Nomura | |
| 5,617,823 A | 4/1997 | Gray | |
| 6,129,066 A | 10/2000 | Umierski | |
| 6,152,101 A | 11/2000 | Parsi | |
| 6,170,454 B1 | 1/2001 | McFarland | |
| 6,170,455 B1 | 1/2001 | Eissle | |
| 6,336,437 B1 * | 1/2002 | Baika | F02B 23/104 |
| | | | 123/298 |
| 6,609,490 B2 | 8/2003 | Flinchbaugh | |
| 6,708,666 B2 | 3/2004 | Roberts | |
| 6,845,741 B2 | 1/2005 | Saruwatari | |
| 6,910,455 B2 | 6/2005 | Sczepanski | |
| 6,935,301 B2 | 8/2005 | Liu | |
| 7,810,479 B2 | 10/2010 | Naquin | |
| 8,813,718 B2 * | 8/2014 | Malfa | F02B 23/08 |
| | | | 123/307 |
| 8,967,129 B2 | 3/2015 | Mueller | |
| 9,303,594 B2 | 4/2016 | Malfa | |
| 10,184,388 B1 * | 1/2019 | Ahmad | F02B 23/0672 |
| 2003/0089329 A1 * | 5/2003 | Flinchbaugh | F02F 3/28 |
| | | | 123/193.6 |
| 2006/0169257 A1 | 8/2006 | Ziehl | |
| 2008/0135007 A1 * | 6/2008 | Storm | F02B 23/0654 |
| | | | 123/143 C |
| 2011/0253094 A1 * | 10/2011 | Rothbauer | F02B 23/0651 |
| | | | 123/276 |
| 2011/0253095 A1 * | 10/2011 | Rothbauer | F02F 3/26 |
| | | | 123/276 |
| 2011/0265770 A1 * | 11/2011 | Malfa | F02B 23/08 |
| | | | 123/559.1 |
| 2014/0186174 A1 | 7/2014 | Malfa | |
| 2014/0196439 A1 * | 7/2014 | Dolan | C25D 9/12 |
| | | | 60/274 |
| 2014/0326224 A1 | 11/2014 | Malfa | |
| 2017/0107935 A1 * | 4/2017 | Kemmerling | F02F 3/14 |
| 2018/0100466 A1 * | 4/2018 | Bowditch | F02F 1/242 |

\* cited by examiner

POWER PISTON

CROSS REFERENCE TO RELATED APPLICATIONS

This application claims the benefit of provisional patent application Ser. No. 62/600,868, filed Mar. 7, 2017

BACKGROUND OF THE INVENTION

In the internal combustion engine there have been many attempts to optimize fuel efficiency and power output while minimizing pollutants.

Many "solutions" exchange one options "increase" [power] for another options "decrease" [poor fuel efficiency and/or increased emissions].

Some current mechanisms are partially successful but only at significantly increased cost and complexity, with high maintenance required.

Examples are: variable valve timing, additional valves, additional spark plugs, turbo charging, multiple fuel injection and other methods.

Expensive catalytic converters are still required to "re-burn" exhaust gases to acceptable pollutant levels despite these measures.

It is well known in the art that increasing the turbulence of the air/fuel mix can "potentially" provide a faster, more complete fuel "burn" resulting in increased power if the turbulence is uniform in nature.

Increased turbulence also can "potentially" help equalize the uneven high temperatures and pressures that cause engine wear as well as NOX pollutants—once again, IF the turbulence is uniform and controlled.

However, UN-controlled turbulence can also cause worse engine performance especially as RPM changes also change turbulence patterns.

The ideal turbulence created should be uniform and controlled during the combustion cycle and preferably travel inversely INTO the flame front [to increase burn rate] and be "unaffected" by RPM changes.

PRIOR ART

One attempt of prior art to control turbulence is a "high swirl" induction system that offers a small advantage in an attempt to "swirl" the incoming air prior to entering the combustion chamber.

Unfortunately, this effort is still largely defeated because of fuel injection and ignition prior to Top Dead Center [TDC] of the stroke.

The intense compression force prior to TDC makes it difficult to evenly mix or ignite the fuel/air mixture for maximum effect.

Prior to TDC, the fuel/air mix is highly compressed in a stationary manner [regardless of any prior "swirl" effect] largely defeating the intended purpose.

Another prior art attempt is modification of the cylinder head and/or piston face to leave a void of significant size. [Most notable is the "Hemi" design]

These do provide improved horsepower at specific RPM ranges but do not significantly improve fuel efficiency or decrease pollution.

This larger void also leaves a significant amount of exhaust gas in the combustion chamber that creates problems for later combustion.

Other engine designs try to "swirl" the fuel/air mixture internally [using various geometries in the head, valves and piston] and "hope" for a complete burn while modifying timing and fuel injectors based on readings from numerous sensors a hundred times a second during acceleration/deceleration.

This added complexity is responsible for increased initial cost, poor reliability and significant repair issues in the future.

A single faulty sensor can cause poor performance or a complete breakdown and further causes significant harmful emissions.

Another attempted "fix" [U.S. Pat. Nos. 8,813,718 and 9,303,594] tries to provide increased flow by covering multiple areas of the combustion chamber with various profiles designed to facilitate increased gas flow by creating a "boundary layer" effect at significant cost and complexity.

While these multiple "profiles" do increase overall flow of gases they do not address the new factors created by the more efficient and direct pressure wave inversion method outlined by this application.

There are also numerous variations of piston crown modifications however none have proved commercially successful with most engine designs and they also have not been able to deliver significant increases in fuel economy, power and performance while simultaneously providing a way to reduce sound and emissions.

SUMMARY OF THE INVENTION

The Power Piston Design provides many novel solutions to the major problems faced by manufacturers of combustion engines.

These problems are: poor performance, high emissions, high sound levels, increased engine wear and poor fuel economy with existing designs.

Attempts to overcome these problems add great expense to each engine while reducing reliability and increasing maintenance costs and complexity.

The objective of the Power Piston Design is to optimize engine power and fuel economy while reducing engine wear and pollution with an inexpensive and interchangeable, new method of gaining engine power and efficiency.

These new designs are mechanically reliable, require NO maintenance or any added engine complexity to operate. [the substantially curved profile 7 and Wave Profile designs do not allow carbon buildup due to the increased pressure flow]

These designs may be used on any [2, 4, diesel or other stroke] internal combustion engine to provide optimum performance, fuel economy, emissions and reduced engine wear.

The innovative solutions of the PPD also provide multiple ways to eliminate or reduce the need for the additional, expensive technology like catalytic converters and turbo chargers.

These new designs further have additional applications in many other fields of energy by increasing the surface area of the moving object while at the same time improving the efficiency of the flowing force, whether it is fluid or air.

Therefore, due to the many innovative ways that the Power Piston Design solves these existing problems, the author requests that the proceeding application and new technology be examined based on its merits and the appended claims that follow.

DETAILED DESCRIPTION OF THE PREFERRED EMBODIMENT

The Power Piston Design

The new Power Piston Design [PPD] provides a low cost solution to the existing problems of power losses, poor fuel efficiency and pollution due to un-burned fuel as well as the harmful emissions and excessive wear caused by high pressure and temperature "hot spots" within current engines.

The PPD also provides increased power and performance, regardless of engine design, with a robust and reliable solution that can reduce system complexity.

The PPD further reduces emitted sound and engine wear while providing improved power, acceleration, fuel economy while reducing emissions.

Unlike prior art, these performance improvements are provided throughout the entire revolution per minute [RPM] range of normal engine operation and require no additional engine complexity to operate.

Figure 1:
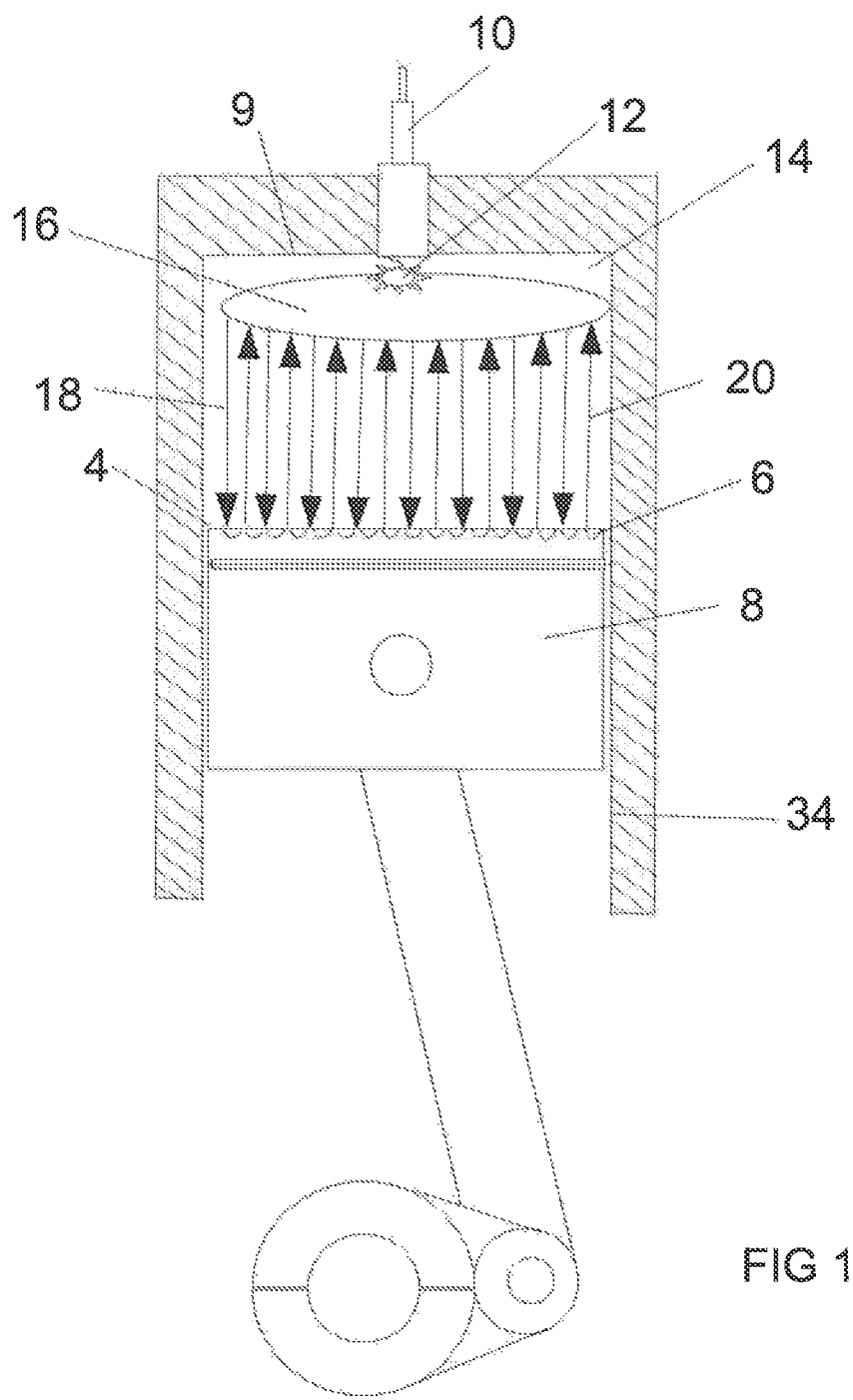
FIG. 1 is a section view of a typical engine cylinder with directional arrows showing the flow of initial pressure waves 18 and inverted pressure 20.

The PPD accomplishes these benefits by providing "Directional Controlled Turbulence" within the combustion chamber 14 with pressure flow that is inverse in direction to the combustion flame front 16. FIG. 1.

This "Directional Controlled Turbulence" is provided by incorporating pressure wave inversion details 6 directly into the piston crown 4.—FIG. 1

The pressure wave inversion details 6 are of a predetermined size and are created by removing a low volume of material from the piston crown 4, which provides minimal detrimental effect on the removal of exhaust.

Figure 5A:
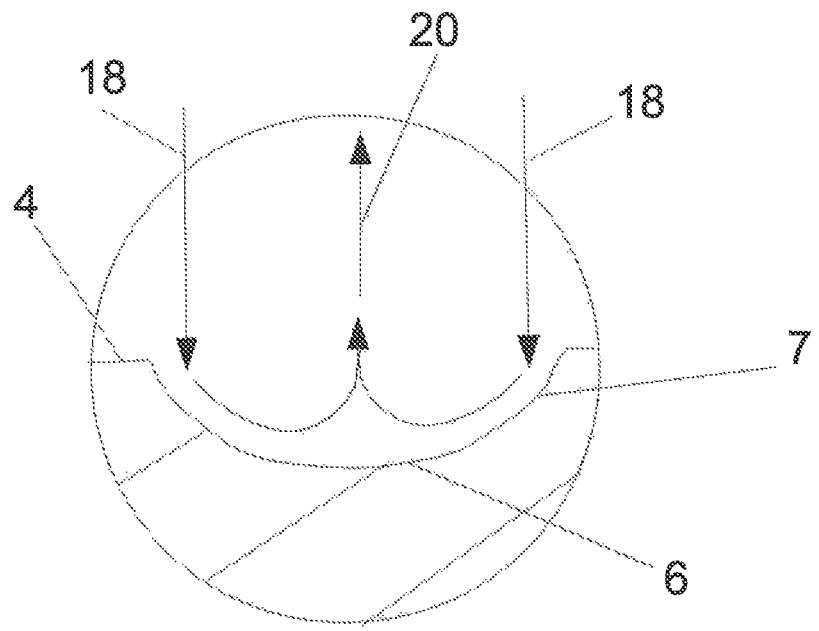
FIG. 5A is a section view of a single pressure wave inversion detail 6.

The pressure wave inversion details 6 further provide a "substantially" curved profile 7 as a means to "catch" and invert the initial pressure [sound] waves 18 [downward flow arrows] formed at ignition 12 back as inverted pressure 20 [upward flow arrows] into the advancing flame front 16. FIGS. 1, 5A.

Note: Pressure [sound] waves travel TWENTY times FASTER than the speed of the flame front of combustion [and significantly faster than piston speed]—this provides an existing UN-USED energy source that would normally leave the engine as emitted sound.

The inner form of the substantially curved profile 7 can be a complete curve [FIG. 5A] or also provided as angled, curved or alternate forms joined to form the "substantial curve" required for providing inverted pressure 20.

Figure 2:
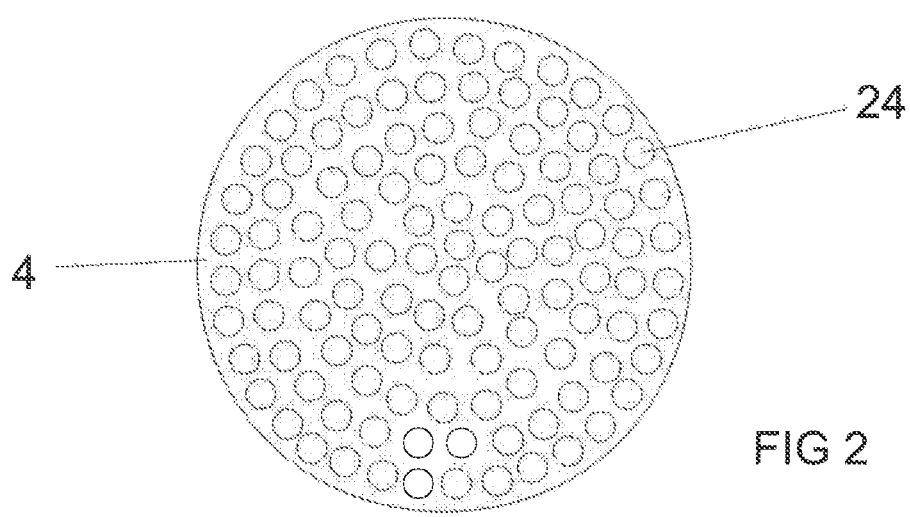
FIG. 2 is a top view of a piston crown 4 with pockets 24.
Figure 3:
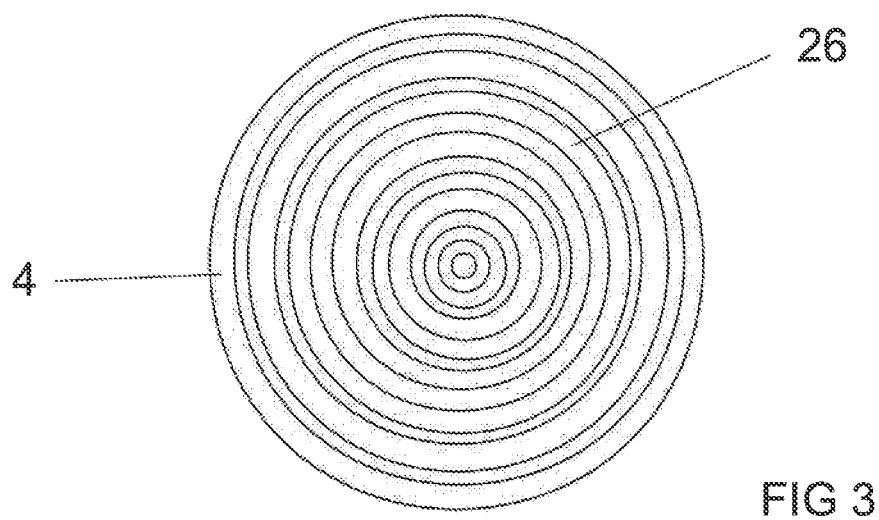
FIG. 3 is a top view of a piston crown 4 with circular grooves 26.

The outline shape of the substantially curved profile 7 can be provided as pockets 24—FIG. 2, circular grooves 26—FIG. 3, or other geometric configurations such as: arc sections, line segments etc.—used separately or joined in combination. [not shown]

As shown in FIG. 5A, the initial pressure waves 18 follow the substantially curved profile 7 inward until the initial pressure waves meet at the center and are forced back [inverted] in a linear manner towards the flame front 16 as inverted pressure 20.

The inverted pressure 20 now forces unburned fuel/air mix directly back into the flame front 16 of combustion while also increasing the atomization of fuel.

The substantially curved profile 7 also geometrically "funnels" and condenses the initial pressure waves 18 into a smaller volumetric area to provide an increased speed of pressure flow, which adds speed to the inverted pressure 20.

This condensed, higher speed inverted pressure 20 now flows as "peaks and valleys" [similar to sine waves] with initial pressure 18 and inverted pressure 20 'bypassing" each other causing "shear" waves of higher and lower pressures and speeds.

This "shear" action also distorts and expands the advancing flame front 16, which exposes more surface area in the flame front 16 to the un-burned fuel/air mix to provide additional increased combustion speed and fuel [combustion] efficiency.

The inverted pressure 20 also continues to "reverberate" within the combustion chamber 14 [by reflecting off of cylinder head 9]—each cycle will again use the pressure wave inversion details 6 to "return" the atomizing inverted pressure 20 force into the advancing flame front 16.

The greatly increased combustion speed further provides additional power to be delivered near the top of the power stroke where it is most effective.

Note: The farther past TDC [Top Dead Center] full combustion takes place the more pressure is "wasted" on the increasing cylinder wall surface area instead of being directly applied to the piston crown.

This increased combustion speed provided by the PPD, closer to ignition 12, provides additional applied force on the piston crown 4 for increased engine performance and power. FIG. 1.

The increased combustion speed will also allow ignition to be modified to take place closer to or AFTER TDC [Top Dead Center] in many engine designs further reducing wear, decreasing emissions and increasing overall engine performance.

Note: Significant "pumping losses" occur in conventional engines that lose engine power when ignition takes place in advance of TDC as well as creating excess emissions [NOX] due to higher pressures and increased engine wear caused by ignition [and excessive pressure] prior to TDC.

The substantially curved profile 7 also directly increases the total surface area of the piston crown 4 [which increases the applied force] due to the geometric shape of the substantially curved profile 7, which provides additional surface area when compared to the surface area of an "un-modified" piston crown. FIGS. 1, 2 and 3.

This increased applied force, directly on the piston crown 4, further provides a means to increase engine performance [acceleration] and power without requiring increased engine displacement or higher compression ratios.

The PPD also increases fuel efficiency per horsepower and decreases the volume of exhaust gases per horsepower.

The increased engine power now available, combined with LESS fuel burned, also reduces the internal pressures inside the combustion chamber 14, reducing the decibel level of the sound [pressure] leaving the system.

The actions resulting from the pressure wave inversion details 6 thereby lead directly to reduced emitted sound due to these new factors.

The increased surface area, provided by the substantially curved profile 7, also creates additional suction during the intake stroke and additional outward flow on the exhaust stroke.

Initial testing has shown an increase of over 20% in top end RPM and this increased flow action will also provide performance increases in NON-combustion, reciprocating applications such as air compression.

The "Directional Controlled Turbulence" provided by the inverted pressure 20 also promotes "uniform" combustion through better pressure distribution throughout the combustion chamber 14 while at the same time reducing the temperature "hot spots" that produce most NOX emissions.

Overall engine temperatures are further reduced due to requiring/burning less fuel per the horsepower required which also reduces engine wear.

These new actions [provided by pressure wave inversion details 6] significantly increase the speed of combustion and combustion efficiency which provides the benefits of increased power and acceleration while using less fuel and reducing harmful emissions.

Fuel is also burned faster, more uniformly and more completely—REGARDLESS of RPM [unlike conventional designs] due to the uniform speed of the inverted pressure 20.

Figure 4:
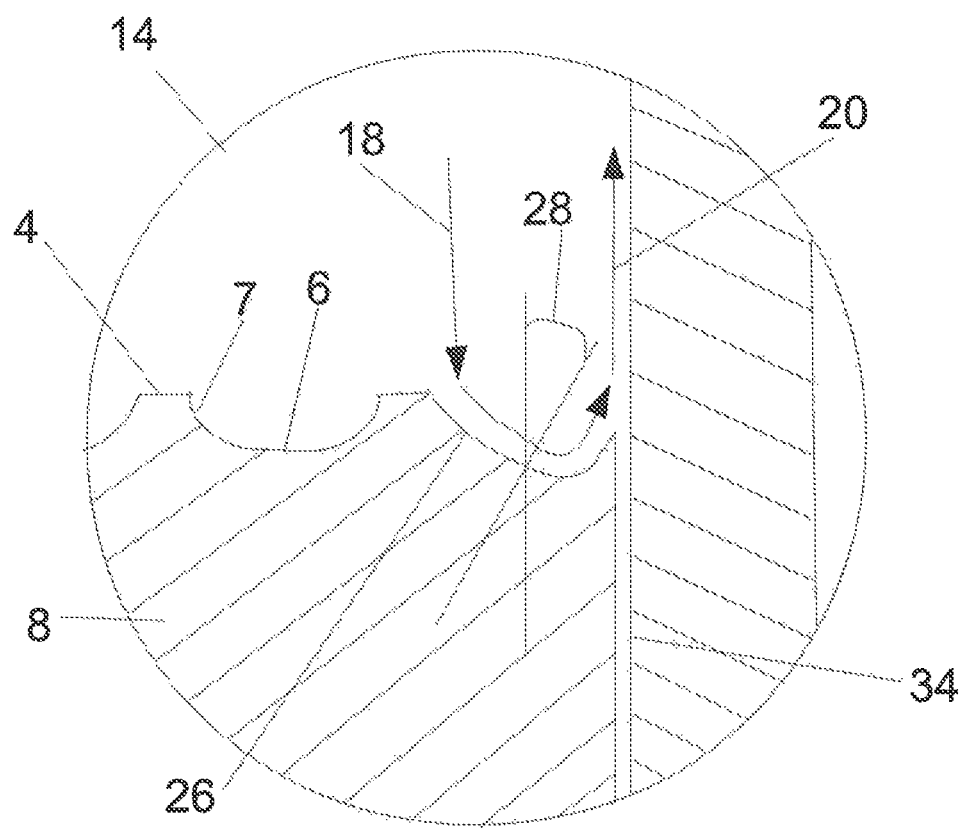
FIG. 4 is a section view showing "re-directed" inverted pressure 20 [using flow arrows] provided by axis rotation 28.

This inverted pressure 20 will travel in a linear manner [in-line with piston travel, FIG. 1] or can be "re-directed" at various features in the combustion chamber 14. FIG. 4.

For example: For cylinder walls [FIG. 4] the outer ring of a groove 26 [or pocket 24] is "tilted" by axis rotation 28 [of the pressure wave inversion detail 6] to 're-direct" inverted pressure 20 at the cylinder wall 34.

This axis rotation 28 provides a means to "re-direct" the inverted pressure 20 in a NON-linear manner to provide more uniform cylinder wall temperatures which results in less wear and friction, prolonging engine life.

By axis rotation 28, any pressure wave inversion detail 6 may be "tilted and aimed" at items [such as valves or spark plugs] that require additional pressure flow for improved performance and longevity.

The newly "re-directed" inverted pressure 20 also "scavenges" unburned fuel near the cylinder wall 34 and forces it into the flame front 16.

This "scavenged" fuel [that would normally be wasted and, left un-burned, cause carbon buildup and emissions] further increases fuel economy while decreasing harmful emissions.

The pressure wave inversion details 6 of the PPD can be used to cover up to 100 percent of the piston crown 8 for additional performance.

The Wave Profile

Figure 5B:
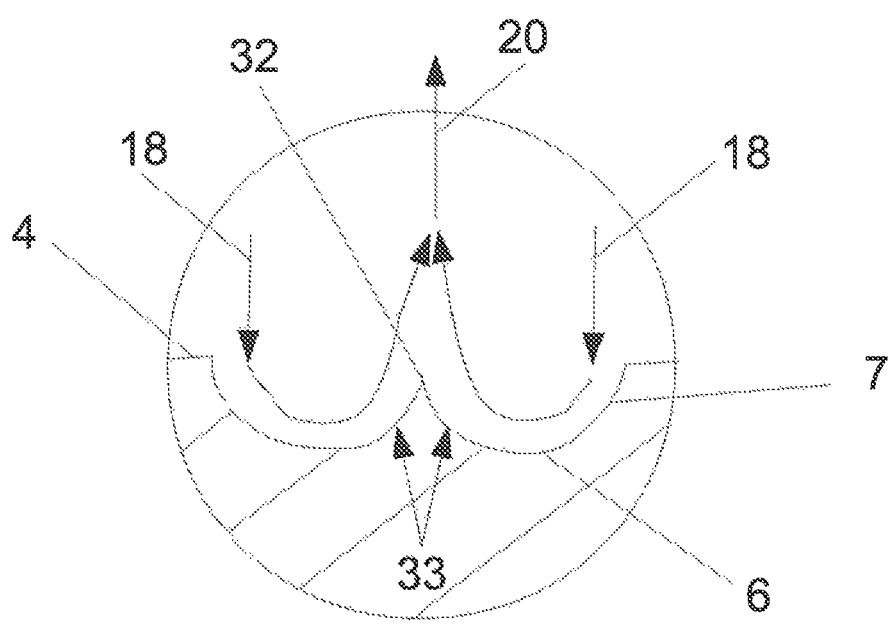
FIG. 5B is a section view of a pressure wave inversion detail 6 with the Wave Profile added.

A Wave Profile may also be incorporated into any pressure wave inversion detail 6 to further ENHANCE all of the original benefits of the Power Piston Design. FIG. 5B.

The Wave Profile [WP] provides FURTHER improvements to: combustion speed, fuel atomization, fuel [combustion] efficiency, pressure distribution, fluid flow rate, more uniform combustion temperatures, engine power and acceleration while reducing emitted sound and harmful emissions.

To provide the Wave Profile, the pressure wave inversion detail 6 is augmented by a raised, sharpened projection 32 with a supporting curved structure 33 near the midpoint of the pressure wave inversion detail 6. FIG. 5B.

Note: The Wave Profile [cross section view shown] is identical for any pressure wave inversion detail 6—a pocket 24 would provide a singular point, a groove 26 would provide a ridge extending lengthwise.

The raised, sharpened point 32 provides a low friction "exit point" [by the reduced surface area provided] for the fluid flow of inverted pressure 20 to leave the pressure wave inversion detail 6 with less frictional resistance.

Friction may also be further reduced by providing "slippery" surface treatments [such as: metallic oxide or ceramic coatings, anodizing, etc.] into the pressure wave inversion details 6 or the entire piston crown 4.

The supporting curved structure 33 is directly joined to the substantially curved profile 7 of a standard pressure wave inversion detail 6. FIG. 5B.

The supporting curved structure 33 may also be comprised of angles, arc sections, line segments, etc., used separately or in combination, to form the "substantially" curved geometry required for smooth pressure flow.

The Wave Profile [WP] increases the "Directional Controlled Turbulence" effect by further enhancing the geometric "condensing" ability of a standard pressure wave inversion detail 6 and the provided reduced friction.

The WP also provides more engine power by providing an additional increase of the surface area of the piston crown 4 [with greater applied force] while still providing the inverted pressure 20 required.

The WP thereby provides an increase in inverted pressure 20 speed with further increased fuel atomization, faster combustion speed and efficiency, faster flow rates, more uniform temperatures and improved engine power and acceleration.

The further increased combustion speed also allows additional combustion to occur directly at IGNITION, which further applies more force directly into the piston crown 4 [instead of cylinder walls 34, as later combustion does] for additional power.

Improved ignition timing is now allowed by the increased combustion speed and improved combustion efficiency of the WP, which allows leaner air/fuel ratios to be used without affecting performance.

The WP also burns fuel more effectively over a wider range of fuel.air ratios and reduces the need for computer adjusted engine changes to burn other grades of fuels or alternatives such as E85 [an ethanol mix].

The improved combustion efficiency and speed provided by the WP further allows lower octane fuels to be utilized in existing engine designs.

The WP may also be "tilted and aimed" by axis rotation 28 to re-direct inverted pressure 20 where desired. [not shown]

The additional structure of the WP also provides an additional reduction in the volume of removed material [from piston crown 4] that allows more detrimental exhaust to be ejected.

The reduced amount of fuel that is required [per horsepower] also further reduces the total amount of exhaust gases that must leave.

The increased engine power now available, combined with LESS fuel burned, allows the WP to further reduce the decibel level of the remaining sound waves leaving the exhaust system.

Additional Benefits

All pressure wave inversion details 6 are also "self-cleaning" due to the ability of the provided high flow rate to keep carbon buildup to a minimum.

The robust geometric form of the PPD further provides a reliable means for improving all facets of engine performance WITHOUT requiring any additional sensors or mechanisms.

A secondary, optional design can be to provide mating "male" details at the top of the cylinder head 9 that will "mate" with the "female" curved profiles 7 to allow for maximum exhaust removal if required. [not shown].

Any version of PPD of can be placed in close proximity to each other and different outline shapes used at the same time [in one piston] if desired.

PPD shapes can be easily cast, molded or machined into piston crowns at low cost and further are self-cleaning due to the ability of the high flow rate to keep carbon buildup to a minimum.

Wall thickness permitting, existing pistons may be re-machined into the novel Power Piston Design.

The PPD can be directly incorporated or retrofitted into existing engine designs with no other physical modifications required.

The emission reductions provided by increased combustion efficiency may also allow the ELIMINATION of expensive catalytic converters and other related equipment.

Fuel injection, intake/exhaust systems and spark timing may now be further customized for optimum system performance.

The PPD may also be utilized in diesel engines and is compatible with fuel injection as well as standard carburetion methods.

These many novel features make the PPD more efficient than prior art in combustion speed, power and fuel efficiency while further reducing harmful emissions and emitted sound levels.

During all four stages [Four stroke Engine] the PPD not only provides a means to fully burn the fuel/air mixture for maximum power and fuel efficiency but also optimize ignition timing, intake and exhaust flow while providing uniform combustion chamber temperatures to reduce engine wear and harmful emissions.

Initial testing has revealed increases in overall engine power and acceleration while providing fuels savings of over 25% and emissions reductions of over 25%.

The method of creating Directional Controlled Turbulence by providing pressure wave inversion details 6 further provides a novel way to utilize the existing pressure waves within any internal combustion engine.

Additional Applications

These novel designs may also be used on other piston driven applications such as hydraulic or pneumatic cylinders as a result of the PPD or MPD providing an increased surface area of the piston crown to increase the speed of fluid flow—in both inward and outward directions.

The PPD or MPD further may be used in standard air compression or other rotary or reciprocating fluid power applications [such as an electric motor driving a piston] for increased fluid flow.

The pressure wave inversion details 6 of the PPD or MPD may also be used to "surface" other fluid power items, such as pump impellors or wind turbine vanes for increased efficiency and reduced wear.

Used in these applications, the pressure wave inversion details 6 function to provide a friction reducing "boundary layer" effect on the "passive" side of the device while also providing increased surface area for increased force and flow on the "aggressive" force receiving or force generating side.

This greatly improves the efficiency of these devices at a very low cost while also reducing the weight of the moving object and the newly created boundary layer of fluid reduces the frictional wear for a longer service life.

I claim:

1. An internal combustion engine comprising:
   a linearly translating piston having a crown translating along an axis within a combustion chamber;
   a plurality of circular depressions incorporated into said crown of said piston of said internal combustion engine;
   wherein each of said plurality of depressions incorporated into said crown of said piston comprise a substantially curved, concave profile with an upwardly extending sharpened projection at a center of each depression providing a geometric ability to permit downward initial pressure contacting a lower surface of the depression to flow inward and converge at the upwardly extending sharpened projection to return pressure upward along the axis as higher speed inverted pressure; and
   wherein said substantially curved profile with said upwardly extending sharpened projection further provides said higher speed inverted pressure and an increase in surface area thereby increasing applied force to said crown of said piston.

2. The engine of claim 1 wherein each of said plurality of depressions comprises a wave profile comprised of:
   a supporting curved structure extending from the lower surface upward to the upwardly extending sharpened projection;
   wherein said supporting curved structure further provides an improved geometric shape with an ability to condense said initial pressure and is adjacent to and connected to said substantially curved profile; and
   wherein said improved geometric shape increases and inverts pressure flow while further providing an increase in surface area as a means to increased applied force to said crown.

3. A performance improvement to the combustion process of an internal combustion engine having a translating piston translating along an axis comprising:
   a plurality of circular depressions incorporated into a crown of said translating piston of said internal combustion engine;
   wherein each of said plurality of depressions incorporated into said crown of said piston comprise a substantially curved, concave profile with an upwardly extending sharpened projection at a center of each depression providing a geometric ability to permit downward initial pressure contacting a lower surface of the depression to flow inward and converge at the upwardly extending sharpened projection to return pressure upward along the axis as higher speed inverted pressure; and
   wherein said substantially curved profile with said upwardly extending sharpened projection inverts pressure flow and further provides an increase in surface area thereby providing a means to increase applied force to said crown of said piston.

4. The performance improvement of claim 3 wherein each of said plurality of depressions further comprises a wave profile comprised of:

a supporting curved structure extending from the lower surface upward to the upwardly extending sharpened projection;

wherein said supporting curved structure further is adjacent to and connected to said substantially curved profile and provides an improved geometric shape with an ability to further condense said initial pressure; and wherein said improved geometric shape further provides additional surface area thereby providing further gains in applied force to said crown of said piston.

5. The performance improvement of claim 3 wherein said higher speed inverted pressure and increase in surface area are configured to provide an increased pressure flow within said internal combustion engine thereby providing more uniform temperatures and pressures.

6. The performance improvement of claim 3 wherein said substantially curved profile is configured to direct said higher speed inverted pressure to travel in a substantially linear direction and bypass remaining said initial pressure thereby providing a means to distort and enlarge the flame front of combustion to increase combustion speed.

7. The performance improvement of claim 3 wherein said plurality of depressions are configured to combine with improved ignition timing to reduce excessive temperatures and pressure.

8. The performance improvement of claim 3 wherein said substantially curved profile is configured to provide a robust geometric form that is mechanically reliable and self-cleaning.

9. The performance improvement of claim 3 wherein said plurality of depressions may further be constructed with various outline shapes selected from the group consisting of circles, ovals, line segments, arcs, grooves, partial grooves or in combination thereby;

whereby said pressure wave inversion details may be economically manufactured by conventional tooling.

10. The performance improvement of claim 3 wherein said plurality of depressions may further be provided during a casting or molding process by inclusion into primary tooling to reduce manufacturing cost.

11. The performance improvement of claim 3 wherein said plurality of depressions are sized to reduce the volume of material required to be removed from said crown of said piston to avoid adversely affecting the performance of said engine.

12. The performance improvement of claim 3 wherein said plurality of depressions further provide coverage in up to 100 percent of the available surface area of said crown.

13. The performance improvement of claim 3 wherein said substantially curved profile further provides a central axis configured to direct said higher speed inverted pressure in a direction angled with respect to the axis to provide additional control of said higher speed inverted pressure.

14. The performance improvement of claim 3 further provides a means to directly utilize fuels of varying types without requiring additional modification or mechanisms to said internal combustion engine due to increased fuel atomization and increased speed of combustion provided by said higher speed inverted pressure.

15. The performance improvement of claim 3 is operable at all levels of revolutions per minute of said internal combustion engine thereby providing a means of increased performance throughout the speed range of said internal combustion engine.

16. The performance improvement of claim 3 further provides a means to reduce the emitted sound of said internal combustion engine due to the consumption of pressure within the combustion cycle.

17. The performance improvement of claim 3 wherein said plurality of depressions are further coated to provide friction reduction.

18. A method of improved efficiency in a reciprocating or linear device translating along an axis comprising:

providing a plurality of circular depressions incorporated into a crown of a piston of said reciprocating or linear device;

wherein said plurality of depressions incorporated into said crown of said piston comprise a substantially curved, concave profile and an upwardly extending sharpened projection at a center of each depression providing a geometric ability to permit downward initial pressure contacting a lower concave surface of each depression to flow inward and converge at said upwardly extending sharpened projection to return condensed pressure upward along said axis as higher speed inverted pressure; and translating the piston along the axis to increase pressure flow and applied force thereby increasing the efficiency of said reciprocating or linear device.

19. A method of improving efficiency and wear reduction in a fluid power device comprising:

providing a plurality of circular depressions incorporated into a surface of a moving part of said fluid power device moving along an axis;

wherein said plurality of depressions incorporated into said crown of said piston comprise a substantially curved, concave profile and an upwardly extending sharpened projection at a center of each depression providing a geometric ability to permit downward initial pressure contacting a lower concave surface of each depression to flow inward and converge at said upwardly extending sharpened projection to return condensed pressure upward along said axis as higher speed inverted pressure; and wherein said substantially curved profile further traps fluid within said plurality of depressions within said surface of said moving part to provide a protective layer of friction reducing fluid thereby providing increased performance of said moving part and further providing a protective layer of trapped fluid that reduces friction to improve efficiency and reduce wear in said fluid power device.

20. The method of claim 19 wherein each depression comprises a wave profile comprised of:

a supporting curved structure extending from the lower surface upward to the upwardly extending sharpened projection; and wherein said supporting curved structure is adjacent to and connected to said substantially curved profile and provides additional surface area to increase force and efficiency.

* * * * *